US008661459B2

(12) United States Patent
Gandhi et al.

(10) Patent No.: US 8,661,459 B2
(45) Date of Patent: Feb. 25, 2014

(54) CONTENT SYNDICATION PLATFORM

(75) Inventors: Amar S. Gandhi, Redmond, WA (US);
Edward J. Praitis, Woodinville, WA (US); Jane T. Kim, Seattle, WA (US);
Sean O. Lyndersay, Redmond, WA (US); Walter V. von Koch, Seattle, WA (US); William Gould, Redmond, WA (US); Bruce A. Morgan, Bellevue, WA (US); Cindy Kwan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1378 days.

(21) Appl. No.: 11/158,936

(22) Filed: Jun. 21, 2005

(65) Prior Publication Data

US 2006/0288329 A1    Dec. 21, 2006

(51) Int. Cl.
*G06F 13/00* (2006.01)
*G06F 9/45* (2006.01)
*G06F 17/00* (2006.01)

(52) U.S. Cl.
USPC ........... 719/328; 717/136; 717/137; 717/140; 717/143; 717/144; 715/234; 715/236; 715/237; 715/239

(58) Field of Classification Search
USPC ................ 719/328; 707/3; 715/234, 239, 749
See application file for complete search history.

(56) References Cited

U.S. PATENT DOCUMENTS

| 5,404,488 | A | 4/1995 | Kerrrigan et al. |
|---|---|---|---|
| 5,649,186 | A | 7/1997 | Ferguson |
| 5,819,034 | A | 10/1998 | Joseph et al. |
| 5,819,284 | A | 10/1998 | Farber et al. |
| 5,845,090 | A | 12/1998 | Collins, III et al. |
| 5,926,796 | A | 7/1999 | Walker et al. |
| 5,960,411 | A | 9/1999 | Hartman et al. |
| 5,974,549 | A | 10/1999 | Golan |
| 6,035,336 | A | 3/2000 | Lu et al. |
| 6,057,834 | A | 5/2000 | Pickover |
| 6,057,837 | A | 5/2000 | Hatakeda et al. |
| 6,078,924 | A | 6/2000 | Ainsbury et al. |
| 6,085,186 | A | 7/2000 | Christianson et al. |
| 6,101,510 | A | 8/2000 | Stone |

(Continued)

FOREIGN PATENT DOCUMENTS

| CA | 2496672 | 2/2004 |
|---|---|---|
| CN | 1536483 | 10/2004 |

(Continued)

OTHER PUBLICATIONS

Gill, Blogging, RSS and the Information Landscape: A look at Online News, Mar. 2005, pp. 1-7.*

(Continued)

*Primary Examiner* — H S Sough
*Assistant Examiner* — Phuong Hoang
(74) *Attorney, Agent, or Firm* — Wolfe-SBMC

(57) ABSTRACT

A content syndication platform, such as a web content syndication platform, manages, organizes and makes available for consumption content that is acquired from the Internet. In at least some embodiments, the platform can acquire and organize web content, and make such content available for consumption by many different types of applications. These applications may or may not necessarily understand the particular syndication format. An application program interface (API) exposes an object model which allows applications and users to easily accomplish many different tasks such as creating, reading, updating, deleting feeds and the like.

22 Claims, 7 Drawing Sheets

(56) References Cited

U.S. PATENT DOCUMENTS

| | | |
|---|---|---|
| 6,282,546 B1 | 8/2001 | Gleichauf et al. |
| 6,366,912 B1 | 4/2002 | Wallent et al. |
| 6,594,692 B1 | 7/2003 | Reisman |
| 6,613,098 B1 | 9/2003 | Sorge et al. |
| 6,694,431 B1 | 2/2004 | Binding et al. |
| 6,708,172 B1 | 3/2004 | Wong et al. |
| 6,732,102 B1 | 5/2004 | Khandekar |
| 6,775,772 B1 | 8/2004 | Binding et al. |
| 6,779,154 B1 | 8/2004 | Nussbaum et al. |
| 6,874,084 B1 | 3/2005 | Dobner et al. |
| 6,917,937 B1 | 7/2005 | Rubendall |
| 6,941,521 B2 | 9/2005 | Lin et al. |
| 7,010,580 B1 | 3/2006 | Fu et al. |
| 7,047,488 B2 * | 5/2006 | Ingersoll et al. ............... 715/235 |
| 7,092,992 B1 | 8/2006 | Yu |
| 7,103,600 B2 | 9/2006 | Mullins |
| 7,451,392 B1 | 11/2008 | Chalecki et al. |
| 7,865,511 B2 * | 1/2011 | Kahn et al. .................... 707/758 |
| 7,979,803 B2 | 7/2011 | Kim |
| 8,200,775 B2 * | 6/2012 | Moore .......................... 709/217 |
| 8,280,843 B2 | 10/2012 | von Koch |
| 2001/0027472 A1 | 10/2001 | Guan |
| 2001/0050658 A1 | 12/2001 | Adams |
| 2001/0051907 A1 | 12/2001 | Kumar et al. |
| 2001/0056460 A1 * | 12/2001 | Sahota et al. .................. 709/201 |
| 2002/0002571 A1 | 1/2002 | Manohar et al. |
| 2002/0010700 A1 | 1/2002 | Wotring |
| 2002/0019812 A1 * | 2/2002 | Board et al. ..................... 705/51 |
| 2002/0026462 A1 * | 2/2002 | Shotton et al. ................ 707/523 |
| 2002/0035617 A1 | 3/2002 | Lynch et al. |
| 2002/0072951 A1 | 6/2002 | Lee et al. |
| 2002/0108115 A1 | 8/2002 | Palmer |
| 2002/0116630 A1 | 8/2002 | Stehlin |
| 2002/0124074 A1 | 9/2002 | Levy et al. |
| 2002/0124172 A1 | 9/2002 | Manahan |
| 2002/0147746 A1 | 10/2002 | Lee |
| 2002/0156905 A1 | 10/2002 | Weissman |
| 2002/0174201 A1 | 11/2002 | Ramer et al. |
| 2002/0184491 A1 | 12/2002 | Morgan et al. |
| 2003/0014406 A1 | 1/2003 | Faieta et al. |
| 2003/0028762 A1 | 2/2003 | Trilli et al. |
| 2003/0033179 A1 | 2/2003 | Katz et al. |
| 2003/0033606 A1 | 2/2003 | Puente et al. |
| 2003/0120671 A1 | 6/2003 | Kim et al. |
| 2003/0135504 A1 | 7/2003 | Elvanoglu et al. |
| 2003/0135553 A1 | 7/2003 | Pendakur |
| 2003/0149737 A1 | 8/2003 | Lambert et al. |
| 2003/0220930 A1 | 11/2003 | Milleker et al. |
| 2003/0229716 A1 | 12/2003 | Holland |
| 2004/0024720 A1 | 2/2004 | Fairweather |
| 2004/0031052 A1 | 2/2004 | Wannamaker et al. |
| 2004/0044961 A1 | 3/2004 | Pesenson |
| 2004/0073924 A1 | 4/2004 | Pendakur |
| 2004/0093296 A1 | 5/2004 | Phelan et al. |
| 2004/0117439 A1 * | 6/2004 | Levett et al. .................. 709/203 |
| 2004/0143683 A1 | 7/2004 | Greenwood |
| 2004/0181753 A1 | 9/2004 | Michaelides |
| 2004/0225749 A1 | 11/2004 | Pavlik et al. |
| 2004/0230676 A1 | 11/2004 | Spivack et al. |
| 2004/0237120 A1 | 11/2004 | Lewin et al. |
| 2004/0250115 A1 | 12/2004 | Gemmel et al. |
| 2005/0010595 A1 | 1/2005 | Brown et al. |
| 2005/0027676 A1 * | 2/2005 | Eichstaedt et al. ................ 707/1 |
| 2005/0033657 A1 | 2/2005 | Herrington |
| 2005/0038717 A1 | 2/2005 | McQueen, III et al. |
| 2005/0039144 A1 | 2/2005 | Wada et al. |
| 2005/0060647 A1 | 3/2005 | Doan et al. |
| 2005/0091220 A1 | 4/2005 | Klemow |
| 2005/0097180 A1 | 5/2005 | Abdelhak |
| 2005/0108227 A1 | 5/2005 | Russell-Falla et al. |
| 2005/0108262 A1 | 5/2005 | Fawcett, Jr. et al. |
| 2005/0108633 A1 * | 5/2005 | Sahota et al. .................. 715/513 |
| 2005/0114757 A1 | 5/2005 | Sahota et al. |
| 2005/0119910 A1 | 6/2005 | Schneider |
| 2005/0154978 A1 * | 7/2005 | Albornoz et al. .............. 715/513 |
| 2005/0165615 A1 | 7/2005 | Minar |
| 2005/0188078 A1 * | 8/2005 | Kotzin et al. .................. 709/224 |
| 2005/0216439 A1 | 9/2005 | Kawakita |
| 2005/0216452 A1 * | 9/2005 | Teague ............................. 707/3 |
| 2005/0216837 A1 * | 9/2005 | Washburn ..................... 715/708 |
| 2005/0228887 A1 | 10/2005 | Wang |
| 2005/0268100 A1 | 12/2005 | Gasparini et al. |
| 2005/0289147 A1 * | 12/2005 | Kahn et al. ..................... 707/10 |
| 2005/0289468 A1 | 12/2005 | Kahn et al. |
| 2006/0004703 A1 | 1/2006 | Spivack et al. |
| 2006/0041593 A1 | 2/2006 | Borthakur et al. |
| 2006/0053293 A1 | 3/2006 | Zager et al. |
| 2006/0095507 A1 * | 5/2006 | Watson ......................... 709/203 |
| 2006/0095860 A1 | 5/2006 | Wada et al. |
| 2006/0129917 A1 | 6/2006 | Volk et al. |
| 2006/0161845 A1 | 7/2006 | Kahn et al. |
| 2006/0173865 A1 | 8/2006 | Fong |
| 2006/0173985 A1 | 8/2006 | Moore |
| 2006/0179060 A1 | 8/2006 | Shilo et al. |
| 2006/0184617 A1 | 8/2006 | Nicholas et al. |
| 2006/0200443 A1 | 9/2006 | Kahn et al. |
| 2006/0200740 A1 | 9/2006 | Kahn et al. |
| 2006/0206803 A1 | 9/2006 | Smith |
| 2006/0213976 A1 | 9/2006 | Inakoshi et al. |
| 2006/0213979 A1 | 9/2006 | Geller et al. |
| 2006/0218403 A1 | 9/2006 | Sauve et al. |
| 2006/0230021 A1 | 10/2006 | Diab et al. |
| 2006/0230071 A1 | 10/2006 | Kass et al. |
| 2006/0242663 A1 | 10/2006 | Gogerty |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0288011 A1 | 12/2006 | Gandhi et al. |
| 2007/0011156 A1 | 1/2007 | Maron |
| 2007/0011665 A1 | 1/2007 | Gandhi et al. |
| 2007/0022174 A1 | 1/2007 | Issa |
| 2007/0033290 A1 | 2/2007 | Valen et al. |
| 2007/0050446 A1 | 3/2007 | Moore |
| 2007/0079321 A1 | 4/2007 | Ott, IV |
| 2007/0100836 A1 | 5/2007 | Eichstaedt et al. |
| 2007/0101313 A1 | 5/2007 | Bodin et al. |
| 2007/0208759 A1 | 9/2007 | von Koch |
| 2007/0245251 A1 | 10/2007 | Kim |
| 2008/0195483 A1 | 8/2008 | Moora |
| 2009/0013266 A1 | 1/2009 | Gandhi |
| 2009/0019063 A1 | 1/2009 | Gandhi |
| 2012/0297290 A1 | 11/2012 | von Koch et al. |

FOREIGN PATENT DOCUMENTS

| | | |
|---|---|---|
| CN | 1124673 | 7/2009 |
| EP | 1997023 | 12/2008 |
| JP | 6180698 | 6/1994 |
| JP | 2008724117 | 12/2008 |
| KR | 102003004225 | 5/2003 |
| WO | WO-01/26018 | 4/2001 |
| WO | WO-0144934 | 6/2001 |
| WO | WO-0182139 | 11/2001 |
| WO | WO 02/07013 | 1/2002 |
| WO | WO 2004/107216 | 12/2004 |
| WO | WO 2005027402 | 3/2005 |
| WO | WO-2005/089336 | 9/2005 |
| WO | WO-2007001882 | 1/2007 |

OTHER PUBLICATIONS

"Safari RSS: Your Desktop is the new doorstep", Apple Computer Inc., 2005, printed from website: http://www.apple.com/macosx/features/safari/, 3 pages.

"Mac OS X Server", Apple Computer Inc., 2005, printed from website: http://www.apple.com/server/macosx/features/collaborationservices.html., 3 pages.

"Google Search Appliance Feeds Protocol Developer's Guide", Google Inc., Jun. 2, 2005, printed from website: http://code.google.com/gsa_apis/feedsguide.html, 11 pages.

"iSpeak It: Web Feeds and Podcasts", ZappTek, 2002, printed from website: http://www.zapptek.com/ispeak-it/webpage.html, 3 pages.

"MX RSS Reader-Writer: Use RSS feeds in your sites", InterAKT,

(56) References Cited

OTHER PUBLICATIONS printed Jun. 21, 2005 from website: http://www.interaktonline.com/Products/Dreamweaver-Extensions/MXRSSReader-Writer/Overview/?from=gg_rss, 2 pages.
"About Syndication, RSS, and Other Web-Altering Chemicals", FeedBurner, printed on Jun. 21, 2005 from website: http://www.feedburner.com/fb/a/aboutrss;jsessionid=96C24011924801F8B3CAF4F12B66B75D.app2, 2 pages.
"Dreams of a Rarebit Fiend", printed on Jun. 21, 2005 from website: http://www.johnmunsch.com/projects/HotSheet/, 6 pages.
"Latest Headline Viewer news and information", Version: 0.9.9, Mar. 2, 2005, printed from website: http://www.headlineviewer.com/news/index.shtml, 3 pages.
"Project: RSS Viewer: Summary", SourceForge, 2005, printed from website: http://sourceforge.net/projects/rssview/, 3 pages.
"Welcome to Feed on Feeds, your server side personal RSS(and Atom!) aggregator", printed on Jun. 21, 2005 from website: http://feedonfeeds.com/, 4 pages.
"What is Reptile?", printed on Jun. 21, 2005 from website: http://reptile.openprivacy.org/overview.html, 2001, 4 pages.
Microsoft, Andersen et al. "Changes to Functionality in Microsoft Windows XP Service Pack 2", website at http://www.microsoft.com/technet/prodtechnol/ winxppro/maintain /sp2brows.mspx, Aug. 9, 2004, 58 pages, printed Jul. 7, 2005.
Microsoft. "Increase Your Browsing and E-Mail Safety" website at http://www.microsoft.com/security/incident/settings.mspx, Oct. 3, 2003, 4 pages, pritned Jul. 7, 2005.
Mozilla, "Why Use Firefox", website at http://www.mozilla.org/products/firefox, Jun. 17, 2005, 3 pages, printed Jul. 7, 2005.
ATPM, Tetrault, Gregory, "Review: Anonymizer Ultimate Security Suite", website at http://www.atpm.com/8/.09/anonymizer.shtml, Sep. 2002, 12 pages, printed Jul. 7, 2005.
"Final Office Action", U.S. Appl. No. 11/158,398, (Feb. 5, 2009),21 pages.
"Foreign Office Action", Application Serial No. 200680018421.0, (Jan. 9, 2009),10 pages.
"flaggeditems.png", Print screen from Internet Search, Retreived from <http://web.archive.org/web/20050623095655/http://ranchero.com/images/nnw2/flaggeditems.png> on Nov. 13, 2008,1 page.
"Ranchero Software: What's New in NetNewsWire 2.0", Web article, retrieved from <http://web.archive.org/web/20050618014501/http://ranchero.com/netnewswire/whatsnew/netnewswire20.php> on Nov. 13, 2008,pp. 1-3.
"syncing.png", Print Screen from article, retrieved from <http://web.archive.org/web/20050623095327/http://ranchero.com/images/nnw2/syncing.png> on Nov. 13, 2008,1 page.
"Ranchero Software Search Engine Subscriptions", On-line Article, Retrieved from <http://web.archive.org/web/20050714082710/http://ranchero.com/netnewswire/features/searchEngineSubscriptions.php> on Nov. 13, 2008,pp. 1-2.
"SearchFeed.png", Print Screen in article, Retrieved from <http://web.archive.org/web/20050623095831/http://ranchero.com/images/nnw2/searchFeed.png> on Nov. 13, 2008,1 page.
"Searching.png", Print Screen from article, Retrieved from <http://web.archive.org/web/20050623095422/http://ranchero.com/images/nnw2/searching.png> on Nov. 13, 2008,1 page.
"Ranchero Software_Smart Lists", Internet Article, Retrieved from <http://web.archive.org/web/20050602084724/http://ranchero.com/netnewswire/features/smartLists.php> on Nov. 13, 2008,pp. 1-2.
"smartList.png", Print Screen from Internet Article, Retrieved from <http://web.archive.org/web/20050623095628/http://ranchero.com/images/nnw2/smartList.png> on Nov. 13, 2008,1 page.
"Ranchero Software_Flagged Items", Internet Article, Retrieved from <http://web.archive.org/web/20050612083011/http://ranchero.com/netnewswire/features/flaggedItems.php> on Nov. 13, 2008,1 page.
"Rancho Software_Features Chart", Internet Article, Retrieved from <http://web.archive.org/web/20050609010027/http://ranchero.com/netnewswire/featureschart20.php> on Nov. 13, 2008,pp. 1-3.
"Persistence.png", Print Screen from Internet Article, Retrieved from <http://web.archive.org/web/20050623095937/http://ranchero.com/images/nnw2/persistence.png> on Nov. 13, 2008,1 page.
"Ranchero Software_Subscription Sharing", Internet Article, Retrieved from <http://web.archive.org/web/20050811083741/http://ranchero.com/netnewswire/features/sharing.php> on Nov. 13, 2008,pp. 1-3.
"mainWindow2.png", Print Screen from Internet Article, Retrieved from <http://web.archive.org/web/20050623095300/http://ranchero.com/images/nnw2/mainWindow2.png> on Nov. 13, 2008,1 page.
"Ranchero Software_NetNewsWire", Internet Article, Retrieved from <http://web.archive.org/web/20051003204517/ranchero.com/netnewswire/> on Nov. 13, 2008,pp. 1-5.
"Search Engine Subscriptions", Internet Article, Retrieved from <http://web.archive.org/web/20051217013212/http://ranchero.com/netnewswire/helpBook/searchEngineSubs.html> on Nov. 13, 2008,1 page.
"Syncing", Internet Article, Retrieved from <http://web.archive.org/web/20051217023557/http://ranchero.com/netnewswire/helpBook/syncing.html> on Nov. 13, 2008,pp. 1-2.
"Subscribing and Unsubscribing", Internet Article, Retrieved from <http://web.archive.org/web/20060915152527/http://ranchero.com/netnewswire/helpBook/subUnsub.html> on Nov. 13, 2008,pp. 1-2.
"Ranchero Software_NetNewsWire 2.0 Change Notes", Internet Article, Retrieved from <http://web.archive.org/web/20051024203943/http://ranchero.com/netnewswire/changenotes/netnewswire20.php> on Nov. 13, 2008,pp. 1-3.
"Yahoo! Search Services and Tools", Internet Search Screen, Retrieved from <http://web.archive.org/web/20051001065344/http://search.yahoo.com/mrss/submit> on Nov. 13, 2008,1 page.
"Yahoo! Publishers Guide to RSS : Submit your RSS Feed", Internet Article, Retrieved from <http://web.archive.org/web/20051216153612/http://uk.promotions.yahoo.com/publisher/submit.html> on Nov. 13, 2008,pp. 1-3.
"Blogdigger—Add Feed Form", Internet Resource, Retrieved from <http://web.archive.org/web/20050618015745/http://www.blogdigger.com/add.jsp> on Nov. 13, 2008 1 of> on Nov. 13, 2008,1 page.
"RSS Submissions", Internet Article, Retrieved from <http://web.archive.org/web/20050619014308/http://www.rss-specifications.com/rss-submission.htm> on Nov. 13, 2008,pp. 1-3.
"Ranchero Software_Editing LiveJournal Logs", Internet Article, Retrieved from <http://web.archive.org/web/20051217022724/http://ranchero.com/netnewswire/tips/livejournalconfig.php> on Nov. 13, 2008,pp. 1-3.
"Ranchero Software_NetNewsWfaq", Internet Search Engine FAQ sheet, Retrieved from <http://web.archive.org/web/20030201120948/http://ranchero.com/netnewswire/faq.php> on Nov. 13, 2008,pp. 1-4.
"NetNewsWire_helpbook_faq", Internet Search FAQ sheet, Retrieved from <http://web.archive.org/web/20050623234918/http://ranchero.com/netnewswire/helpBook/faq.html> on Nov. 13, 2008,pp. 1-3.
"Syndic8.com—Documents1", Internet Article, Retrieved from <http://web.archive.org/web/20050513214756/http://www.syndic8.com/documents/howto/> on Nov. 13, 2008,pp. 1-3.
"Syndic8.com—Documents2", Internet Article, Retrieved from <http://web.archive.org/web/20050622035505/http://www.syndic8.com/documents/howto/> on Nov. 13, 2008,pp. 1-3.
"Syndic8.com—HowToUse", Internet Article, Retrieved from <http://web.archive.org/web/20050619233841/http://www.syndic8.com/howto.php> on Nov. 13, 2008,pp. 1-4.
"Kalsey_Blogfeed", Internet Article, Retrieved from <http://web.archive.org/web/20050515005125/http://www.kalsey.com/tools/blogfeed/> on Nov. 13, 2008,pp. 1-3.
"RSS 2.0 Specification", (Jul. 15, 2003),1-8.
Hammersley, Ben "Developing Feeds with RSS and Atom", *O'Reilly books,* O'Reilly Media, Inc.,(Apr. 2005),1-10.
Blair, Eric "Review: Netnewswire 2.0", *ATPM 11.06,* (Jun. 2005),1-12.

(56) References Cited

OTHER PUBLICATIONS

"Attensa Outlook—Getting Started", www.attensa.com, (2005),1-33.

Hammersley, Ben "Content Syndication with RSS", *O'Reilly books*, O'Reilly & Associates,(Mar. 2003),1-19.

Ayers, Danny et al., "Beginning RSS and Atom Programming", Wiley Publishing, Inc.,(2005),1-54.

Huier, Zhang et al., "Design and Implementation of RSS-based Science and Technology Information Syndication System", *Library of Chinese Academy of Sciences*, 1-15.

"Non-Final Office Action", U.S. Appl. No. 11/158,398, (Sep. 8, 2009),9 pages.

Anonymous, "The Evolution of RSS", (Online); XP002546010; Internet; Retrieved from the Internet: URL:http://web.archive.org/web/20041011055544/http://www.webreference.com/authoring/languages/xml/rss/1/7.html *the whole document*,(Oct. 11, 2004),1 page.

"EP Search Report", Application Serial No. 07750552.7, EESR,(Sep. 30, 2009),6 pages.

"JP Notice of Publication", Application Serial No. 2008-558275, (Aug. 6, 2009),2 pages.

"JP Notice of Publication", Application Serial No. 2008-558294, (Aug. 13, 2009),2 pages.

"Non-Final Office Action", U.S. Appl. No. 11/276,536, (Oct. 7, 2009),15 pages.

"Final Office Action", U.S. Appl. No. 11/158,911, (Oct. 28, 2009),10 pages.

"Final Office Action", U.S. Appl. No. 11/276,584, (Oct. 29, 2009),12 pages.

"The Feed Thickens", Retrieved from: <http://blog.flickr.net/en/2004/07/14/the-feed-thickens/>, (Jul. 14, 2004),2 pages.

"Bradbury Software FeedDemon 1.0", cited by examiner, (Jun. 2, 2004),3 pages.

Verisign Inc., "Licensing VeriSign Certificates: Securing Multiple Web Server and Domain Configurations", www.msctrustgate.com/pdf/licensing.pdf, white paper,(Nov. 2, 2001),15 pages.

Herzberg, Amir et al., "Protecting (even) Naive Web Users, or: Preventing Spoofing and Establishing Credential Web Sites", www.cs.bu.ac.il/~herzea/papers/ecommerce/trusted_credentials_area.pdf, Bar Ilan University,(Jul. 18, 2004),26 pages.

Ncipher, Inc., "Protecting Commercial Secure Web Servers from Key-Finding Threats", www.ncipher.com/uploads/resources/pcws.pdf, white paper,(1999),12 pages.

"Feed Splicing, Part 1", Retrieved from: "http://blogs.feedburner.com/feedburner/archives/2004/07/feed_splicing_part_i.php", (Jul. 14, 2004),pp. 1-5.

"FeedBurner", Retrieved from <http://www.feedburner.com> on Dec. 8, 2008, (Feb. 25, 2004),1 Page.

"Introduction to RSS", Retrieved from: "http://www.webreference.com/authoring/languages/xml/rss/intro.", (Mar. 27, 2000),3 Pages.

"Feed Splicing, Part 2", Retrieved from <http://blogs.feedburner.com/feedburner/archives/2004/08feed_splicing_part_ii.php> on Dec. 8, 2008, The Feed Thickens. http://blog.flicker.net/en/2007/14/the-feed-thickens.,(Aug. 16, 2004),pp. 1-5.

"Non Final Office Action", U.S. Appl. No. 11/276,536, (Jan. 9, 2009),33 pages.

"Advisory Action", U.S. Appl. No. 11/276,584, (Apr. 17, 2009),3 pages.

"Non Final Office Action", U.S. Appl. No. 11/276,536, (May 28, 2009),18 pages.

Benzinger, Brian "Google Reader Reviewed", Retrieved from <http://www.solutionwatch.com/250/google-reader-reviewed>, (Oct. 7, 2005),5 pages.

"Google Reader: beta feed reader", Retrieved from <http://www.consumingexperience.com/2005/10/google-reader-beta-feed-reader.html,(Oct. 7, 2005).

"Non Final Office Action", U.S. Appl. No. 11/276,584, (Jun. 25, 2009),11 pages.

"Non Final Office Action", U.S. Appl. No. 11/158,911, (Jun. 30, 2009),9 pages.

"EP Search Report", Application No. 07751586.4, (Aug. 13, 2009),9 pages.

Attardi, G et al., "The LOA Customizable Media Aggregator", Automated Production of Cross Media Content for Multi-Channel Distribution, 2005. Axmedis 2005. First International Conference on Florence, Italy 30-02 Nov. 2005, Piscataway, NJ, USA, IEEE, Nov. 30, 2005. XP010892440 ISBN: 978-0-7695-2348-4, (Nov. 30, 2005),115-122.

"Final Office Action", U.S. Appl. No. 11/158,398, (Mar. 22, 2010),11 pages.

"First Office Action", Chinese Application No. 200780007512.9, (Jan. 15, 2010),7 pages.

"First Office Action", Chinese Application No. 200780008302.1, (Jan. 8, 2010),15 pages.

"Foreign Office Action", Application Serial No. 07750552.7, (Nov. 17, 2009),6 pages.

"Non-Final Office Action", U.S. Appl. No. 11/276,584, (Dec. 28, 2009),12 pages.

"Final Office Action", U.S. Appl. No. 11/276,536, (Nov. 9, 2011), 16 pages.

"Final Rejection", Chinese Application No. 200680021415.0, (Sep. 2, 2011), 3 Pages.

"Foreign Office Action", Chinese Application No. 200780008302.1, (Dec. 6, 2011), 7 pages.

"Foreign Office Action", Japanese Application No. 2008-518243, (Oct. 20, 2011), 6 pages.

"Foreign Office Action", Japanese Application No. 2008-558294, (Oct. 19, 2011), 5 pages.

"Non-Final Office Action", U.S. Appl. No. 11/158,398, (Nov. 28, 2011), 15 pages.

"Non-Final Office Action", U.S. Appl. No. 11/158,398, (May 14, 2008), 9 Pages.

"Advisory Action", U.S. Appl. No. 11/158,398, (Jan. 26, 2011),3 pages.

"Final Office Action", U.S. Appl. No. 11/276,536, (Mar. 4, 2011),17 pages.

"Final Office Action", U.S. Appl. No. 11/276,584, (Dec. 23, 2010),4 pages.

"Foreign Office Action", Chinese Application No. 200780008302.1, (Dec. 16, 2010),12 pages.

"Notice of Acceptance", Australian Application No. 2006262540, (Dec. 22, 2010),2 pages.

"Notice of Allowance", U.S. Appl. No. 11/276,584, (Mar. 7, 2011),6 pages.

"Decision on Reexamination", Chinese Application No. 200680021415.0, (Jan. 16, 2012), 2 pages.

"Foreign Office Action", Chinese Application No. 200680021415.0, (Mar. 14, 2012), 9 pages.

"Foreign Office Action", Japanese Application No. 2008-558275, (Feb. 28, 2012), 5 pages.

"Non-Final Office Action", U.S. Appl. No. 11/158,911, (Feb. 21, 2012), 10 pages.

"Extended European Search Report", EP Application No. 06773165.3, (Jan. 24, 2011),12 pages.

"Final Office Action", U.S. Appl. No. 12/234,449, (Mar. 25, 2011),11 pages.

"Foreign Office Action", Chinese Application No. 200680021415.0, (Mar. 14, 2011),10 pages.

"Non-Final Office Action", U.S. Appl. No. 12/234,403, (Apr. 1, 2011),10 pages.

Daily, Geoff "Aggregating the Aggregators: RSS Reader Round-Up", Econtent, Online, Inc., vol. 28, No. 4,(Apr. 2005),6 pages.

Hammond, Tony et al., "The Role of RSS in Science Publishing—Syndication and Annotation on the Web", D-Lib Magazine, vol. 10, No. 12,(Dec. 2004),15 pages.

"Front Line of RSS Media Business; The Third Internet Media Following E-mail and Web", *Redcruise, Inc.*, Internet Magazine, Japan, Impress, Inc., No. 127,(Aug. 1, 2005),32 pages.

"Final Office Action", U.S. Appl. No. 11/158,398, (May 24, 2012),12 pages.

"Foreign Office Action", Chinese Application No. 200680021415.0, (Jun. 29, 2012),6 pages.

(56) References Cited

OTHER PUBLICATIONS

"Foreign Office Action", Chinese Application No. 200780007512.9, (May 14, 2012),7 pages.
"Foreign Office Action", Japanese Application No. 2008-558294, (Apr. 13, 2012),5 pages.
"Foreign Office Action", Mexican Application No. MX/a/2008/01105, (Jun. 2, 2012),12 pages.
"Notice of Allowance", U.S. Appl. No. 11/276,536, (May 25, 2012),11 pages.
De Sutter, Robbie et al., "Enhancing RSS Feeds: Eliminating Overhead through Binary Encoding", In Proceedings of ICITA 2005,(Jul. 3, 2005),6 pages.
Norihiko, Ike "Introduction to Podcasting Enjoyable by Personal Computers and Portable Music Players", Softbank Creative, vol. 11, No. 1,(Jan. 1, 2006),pp. 118-123.
"Final Office Action", U.S. Appl. No. 11/276,536, (Apr. 23, 2010),20 pages.
"Foreign Office Action", Chinese Application No. 200680018421.0, (Jun. 24, 2010),11 pages.
"Foreign Office Action", Chinese Application No. 200680021415.0, (Jun. 8, 2010),10 pages.
"Non-Final Office Action", U.S. Appl. No. 11/158,398, (May 13, 2010),10 pages.
"Non-Final Office Action", U.S. Appl. No. 11/158,911, (Jun. 10, 2010),11 pages.
"Non-Final Office Action", U.S. Appl. No. 12/234,449, (Jun. 1, 2010),8 pages.
"Foreign Office Action", Chinese Application No. 200780007512.9, (May 25, 2011), 9 pages.
"Non-Final Office Action", U.S. Appl. No. 11/276,536, (Jun. 23, 2011), 14 pages.
"Non-Final Office Action", U.S. Appl. No. 11/276,584, (Jul. 26, 2010),14 pages.
"Google Reader: Reviewer's Guide", Available at: <http://www.google.com/press/guides/reader_overview.pdf>, (Oct. 16, 2005),pp. 1-5.
"Decision on Rejection", Chinese Application No. 200680021415.0, (Sep. 2, 2011),12 pages.
"Final Office Action", U.S. Appl. No. 12/234,403, (Oct. 4, 2011),18 pages.
"Foreign Office Action", Chinese Application No. 200780007512.9, (Sep. 26, 2011),10 pages.
"Foreign Office Action", Chinese Application No. 200780008302.1, (Sep. 15, 2011),9 pages.
"Foreign Office Action", Mexican Application No. MX/a/2008/11058, (Jul. 6, 2011),6 pages.
Han, Richard et al., "Websplitter: A Unified XML Framework for Multi-Device Collaborative Web Browsing", *ACM Conference on Computer Supported Cooperative Work*, (2000),10 pages.
Hardy, Matthew R., et al., "Mapping and Displaying Structural Transformations between XML and PDF", *Proceedings of the 2002 ACM symposium on Document engineering*, (Nov. 8-9, 2002),pp. 95-102.
Chien, et al., "Efficient Management of Multiversion Documents by Object Referencing", Proceedings of the 27th VLDB Conference,(2001),pp. 291-300.
Ciancarini, Paolo A., et al., "Managing Complex Documents Over the WWW: A Case for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999),pp. 1-14.
Kutay, Ali et al., "Methods and Systems for Accessing, Organizing, Presenting and viewing Data", U.S. Appl. No. 60/209,713, filed Jun. 5, 2000, Kutay et al., 345 pages.
"Final Office Action", U.S. Appl. No. 11/276,536, (Jun. 20, 2008), 28 pages.
"Foreign Office Action", Japanese Application No. 2008-558294, (Aug. 7, 2012), 4 pages.
"Foreign Office Action", Korean Application No. 10-2007-7029137, (May 24, 2012), 7 pages.
"Java.net: The Source for Java Technology Collaboration: rome", retrieved from <https://rome.dev.java.net/> on Jan. 17, 2006, 2 pages.
"Non-Final Office Action", U.S. Appl. No. 11/276,536, (Dec. 26, 2007), 24 pages.
"Non-Final Office Action", U.S. Appl. No. 12/234,449, (Oct. 4, 2012), 9 pages.
"Foreign Office Action",Chinese Application No. 200780007512.9, (Dec. 3, 2012), 11 pages.
"Foreign Office Action", Korean Application No. 10-2007-7029137, (Dec. 27, 2012), 6 pages.
"International Search Report and Written Opinion", Application No. PCT/US2007/003722, (Jul. 24, 2007), 7 pages.
"Non-Final Office Action", U.S. Appl. No. 12/234,403, (Jun. 6, 2013),19 pages.
"Non-Final Office Action", U.S. Appl. No. 12/234,449, (Jun. 13, 2013), 9 pages.
"Foreign Office Action", Korean Application No. 10-2007-7028432, (Jan. 30, 2013), 6 pages.
"Non-Final Office Action", U.S. Appl. No. 13/564,595, (Apr. 12, 2013), 19 pages.
"Final Office Action", U.S. Appl. No. 13/564,595, (Oct. 24, 2013), 9 pages.
"Foreign Office Action", EP Application No. 07750552.7, (Oct. 11, 2013), 5 Pages.
"Foreign Office Action", CA Application No. 2,612,757, (Aug. 21, 2013), 3 pages.

\* cited by examiner

CONTENT SYNDICATION PLATFORM

RELATED APPLICATION

This application is related to U.S. patent application Ser. No. 11/158,911, filed on the same date as this application, entitled "Finding and Consuming Web Subscriptions in a Web Browser", the disclosure of which is incorporated by reference.

BACKGROUND

RSS, which stands for Really Simple Syndication, is one type of web content syndication format. RSS web feeds have become more and more popular on the web and numerous software applications with RSS support are being developed. These numerous applications can have many varied features and can lead users to install several different RSS-enabled applications. Each RSS application will typically have its own list of subscriptions. When the list of subscriptions is small, it is fairly easy for a user to enter and manage those subscriptions across the different applications. As the list of subscriptions grows, however, management of the subscriptions in connection with each of these different RSS-enabled applications becomes very difficult. Thus, it is very easy for subscription lists to become unsynchronized.

In addition, web feeds come in several different file formats, with the popular ones being RSS 0.91, 0.92, 1.0, 2.0 and Atom. Each RSS-enabled application has to support most of these formats and possibly even more in the future. Implementing parsers for use in the RSS context for some applications is more difficult than for others. Given that not all application developers are RSS experts who possess experience and knowledge with regard to the intricacies of each format, it is unlikely that all application developers will implement the parsers correctly. Hence, it is likely given the rich number of file formats that some application developers will opt to not develop applications in this space or, if they do, the applications will not be configured to fully exploit all of the features that are available across the different file formats.

Another aspect of RSS and web feeds pertains to the publishing of content. For example, the number of users with blogs (weblogs) is increasing. There are many publicly available services that provide free blog services. Publishing content to a blog service, however, can be rather cumbersome since it might involve opening a browser, navigating to the blog service, signing in, and then typing the entry and submitting it. Many application developers would prefer to be able to publish from within their particular application, without breaking the user flow by having to go to a website. In addition, there are many different types of protocols that can be used to communicate between a client device and a particular service. Given this, it is unlikely that application developers will implement all protocols. As such, the user experience will not be all that it could be.

SUMMARY

A content syndication platform, such as a web content syndication platform, manages, organizes and makes available for consumption content that is acquired from a source, such as the Internet, an intranet, a private network or other computing device, to name just a few. In some embodiments, the platform can acquire and organize web content, and make such content available for consumption by many different types of applications. These applications may or may not necessarily understand the particular syndication format. An application program interface (API) exposes an object model which allows applications and users to easily accomplish many different tasks such as creating, reading, updating, deleting feeds and the like.

In addition, the platform can abstract away a particular feed format to provide a common format which promotes the useability of feed data that comes into the platform. Further, the platform processes and manages enclosures that might be received via a web feed in a manner that can make the enclosures available for consumption to both syndication-aware applications and applications that are not syndication-aware.

DETAILED DESCRIPTION

Overview

Figure 1:
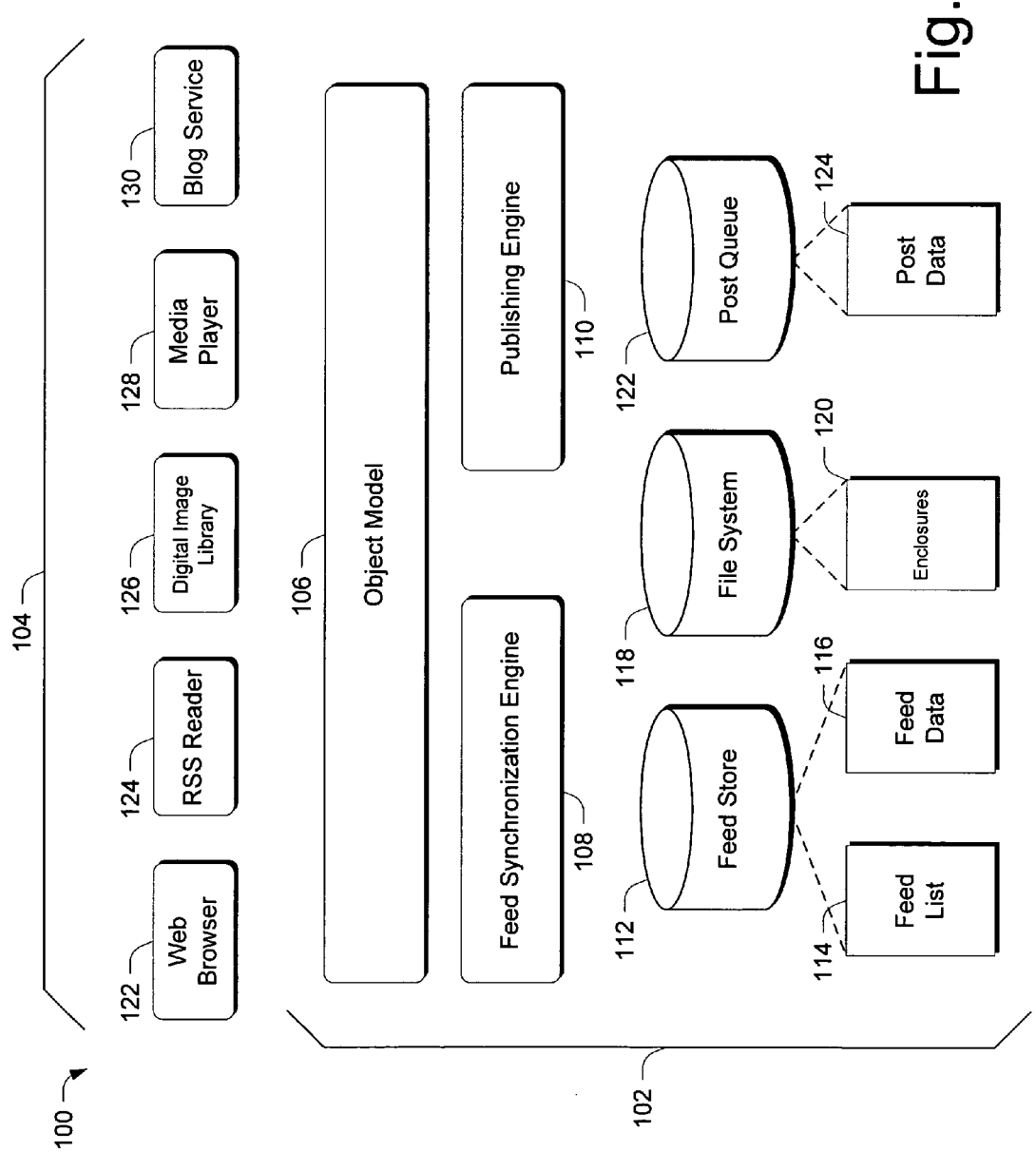
FIG. 1 is a high level block diagram that illustrates a system that includes a web content syndication platform in accordance with one embodiment.

A content syndication platform, such as a web content syndication platform, is described which is utilized to manage, organize and make available for consumption content that is acquired from a source, such as the Internet, an intranet, a private network or other computing device, to name just a few. In the context of this document, the platform is described in the context of an RSS platform that is designed to be used in the context of RSS web feeds. It is to be appreciated and understood that the RSS context constitutes but one example and is not intended to limit application of the claimed subject matter to only RSS contexts. The description below assumes some familiarity on the part of the reader with RSS. For background on RSS, there are a number of publicly available specifications that provide information that may be of interest to the reader.

In this document, certain terminology will be used in the context of the RSS embodiment that is described. An item is a basic unit of a feed. Typically, an item represents a blog entry or a news article/abstract, with a link to the actual article on the website. An enclosure is similar to an email attachment, except that there is a link to actual content. A feed is a list of items in a resource, usually only the most recent additions. A system feed list is a list of feeds to which a user is subscribed. A subscription refers to the act of signing up to receive notifications of new feed items.

In the various embodiments described in this document, the platform can acquire and organize web content, and make such content available for consumption by many different types of applications. These applications may or may not necessarily understand the particular syndication format. Thus, in the implementation example, applications that do not understand the RSS format can nonetheless, through the platform, acquire and consume content, such as enclosures, acquired by the platform through an RSS feed.

The platform comprises an application program interface (API) that exposes an object model which allows applications and users to easily accomplish many different tasks such as creating, reading, updating, deleting feeds and the like. For example, using the API, many different types of applications can access, manage and consume feedlists which includes a list of feeds.

In at least one embodiment, the platformn provides multiple different feed parsers each of which can parse a particular format in which a web feed may be received. The parsed format is then converted into a common format which can then be leveraged by applications and users. The common format is utilized to abstract away specific notions embodied by any one particular format in favor of a more universal, understandable format.

Further, the platform processes and manages enclosures that might be received via a web feed in a manner that can make the enclosures available for consumption to both syndication-aware applications and applications that are not syndication-aware. In at least some embodiments, the APIs allow for discovery of the relationship between an enclosure and its associated feed item.

In the discussion that follows, an exemplary platform and its components are first described under the heading "Web Content Syndication Platform". Following this discussion, an implementation example (under the heading "Implementation Example") is provided and describes a set of APIs that expose an object model that enables applications and users to interact with the platform in a meaningful and robust way.

Web Content Syndication Platform

FIG. 1 shows an exemplary system in accordance with one embodiment, generally at 100. Aspects of system 100 can be implemented in connection with any suitable hardware, software, firmware or combination thereof. In at least one embodiment, aspects of the system are implemented as computer-readable instructions that reside on some type of computer-readable medium.

In this example, system 100 comprises a content syndication platform 102 and a collection of applications 104 individual ones of which can be configured to utilize the platform in different ways, as will become apparent below. In at least some embodiments, the content syndication platform comprises a web content syndication platform. In the discussion that follows, the platform 102 is described in the context of an RSS platform. It is to be appreciated and understood that this is intended as but an example and is not intended to limit application of the claimed subject matter to only RSS environments. Rather, principles of the described embodiments can be utilized in other syndication environments without departing from the spirit and scope of the claimed subject matter.

In this example, platform 102 comprises an object model 106 that is exposed by a set of APIs that enable applications 104 to interact with the platform. A synchronization engine 108 is provided and is configured to, among other things, acquire web content and, in at least some embodiments, convert the web content into a so-called common format, which is described in more detail below.

A publishing engine 110 permits users to publish content, such as blogs, in a manner that abstracts away, via the APIs, the communication protocol that is utilized to communicate between the user's application or computing device and the server or destination software that is to receive the content.

In addition, in at least one embodiment, platform 102 includes a feed store 112 that stores both feed lists 114 and feed data 116. Further, platform 102 utilizes, in at least one embodiment, file system 118 to store and maintain enclosures 120. Using the file system carries with it advantages among which include enabling applications that do not necessarily understand the syndication format to nonetheless consume enclosures that may be of interest. Further, platform 102 includes a post queue 122 that holds post data 124 that is to be posted to a particular web-accessible location.

As noted above, platform 102 can enable applications to access, consume and publish web content. Accordingly, the collection of applications 104 can include many different types of applications. In at least some embodiments, the types of applications can include those that are syndication-aware and those that are not syndication-aware. By "syndication-aware" is meant that the application is at least somewhat familiar with the syndication format that is utilized. Thus, in the RSS context, a syndication-aware application is one that may be configured to process data or otherwise interact with content that is represented in an RSS format. This can include having the ability to parse and meaningfully interact with RSS-formatted data. Similarly, an application that is not syndication-aware is typically not configured to understand the syndication format. Yet, through the platform, as will become apparent below, applications that are not syndication aware can still access and consume content that arrives at the platform in a syndication format.

Looking more specifically at the different types of applications that can interact with the platform, collection 104 includes a web browser application 122, an RSS reader application 124, a digital image library application 126, a media player application 128 and a blog service 130. In this example, RSS reader application 124 is a syndication-aware application, while media player 128 may not necessarily be a syndication-aware application. Further, web browser application 122 may or may not be a syndication-aware application. Of course, these applications constitute but examples of the different types of applications that can interact with the platform. As such, other types of applications that are the same or different from those illustrated can be utilized without departing from the spirit and scope of the claimed subject matter. By way of example and not limitation, these other types of applications can include calendar applications for event feeds, social networking and email applications for contact feeds, screen saver applications for picture feeds, CRM for document feeds, and the like.

In the discussion that follows, aspects of the individual components of the platform 102 are described in more detail, each under its own heading.

Object Model

Figure 2:
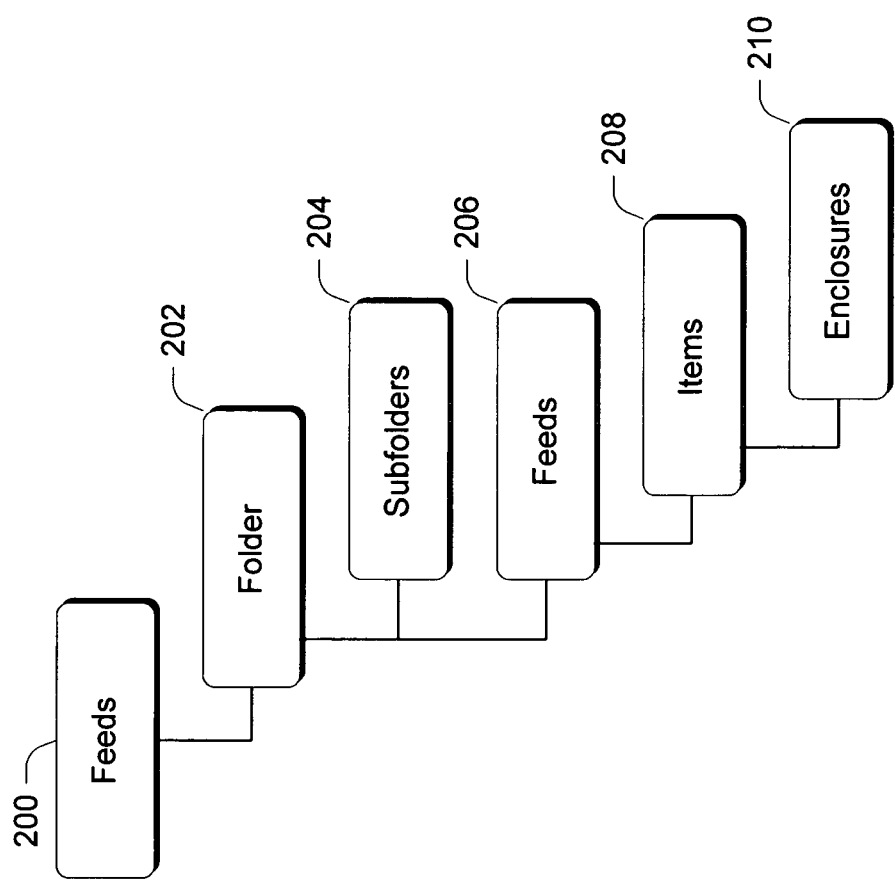
FIG. 2 is a block diagram illustrates aspects of an object model in accordance with one embodiment.

FIG. 2 illustrates individual objects of object model 106 in accordance with one embodiment. The object model about to be described constitutes but one example of an object model that can be utilized and is not intended to limit application of the claimed subject matter to only the object model that is described below. As noted above, the object model is exposed by an API, an example of which is described below.

In this particular object model, a top level object 200 called feeds is provided. The feeds object 200 has a property called subscriptions of the type folder. Subscription or folder objects 202 are modeled as a hierarchy of folders. Thus, in this particular example, subscription or folder objects have properties that include subfolders 204 of the type folder and feeds 206 of the type feed. Underneath the feeds object 206 is an item object 208 of the type item, and underneath the item object 206 is an enclosure object 210 of the type object.

The individual objects of the object model have properties, methods and, in some instances, events that can be utilized to manage web content that is received by the platform. The above-described object model permits a hierarchical structure to be utilized to do such things as manage feedlists and the like. For example, using a folder structure, the platform can execute against a set of feeds. As will be appreciated by the skilled artisan, this makes it easier for the application developer. For example, executing against a set of feeds provides the ability to refresh all of the "news" feeds, located within the news folder.

As an example, consider the following. Assume that a user wishes to interact with or consume data associated with a feed to which they are not actually subscribed. For feeds that are subscribed to, i.e. those that are represented inside the root level subscription folder, the synchronization engine 108 (FIG. 1) will pick up the feed and start to, on an appropriate interval, fetch data associated with the feed. There are cases, however, when an application that uses the platform does not wish to be subscribed to a particular feed. Rather, the application just wants to use the functionality of the platform to access data from a feed. In this case, in this particular embodiment, subscriptions object 202 supports a method that allows a feed to be downloaded without subscribing to the feed. In this particular example, the application calls the method and provides it with a URL associated with the feed. The platform then utilizes the URL to fetch the data of interest to the application. In this manner, the application can acquire data associated with a feed in an adhoc fashion without ever having to subscribe to the feed.

Considering the object model further, consider item and enclosure objects 208, 210 respectively. Here, these objects very much reflect how RSS is structured itself. That is, each RSS feed has individual items inside of which can optionally appear an enclosure. Thus, the structure of the object model is configured to reflect the structure of the syndication format.

From an object model perspective, there are basically two different types of methods and properties on an item. A first type of method/property pertains to data which is read only, and a second type of method/property pertains to data which can be both read and written.

As an example of the first type of method property, consider the following. Each feed can have data associated with it that is represented in an XML structure. This data includes such things as the title, author, language and the like. Data such as this is treated by the object model as read only. For example, the data that is received by a feed and associated with individual items is typically treated as read only. This prevents applications from manipulating this data. Using an XML structure to represent the feed data also carries with it advantages as follows. Assume that the synchronization engine does not understand a new XML element that has been added. Nonetheless, the synchronization engine can still store the element and its associated data as part of the feed item data. For those applications that do understand the element, this element and its associated data are still available for the application to discover and consume.

On the other hand, there is data that is treated as read/write data, such as the name of a particular feed. That is, the user may wish to personalize a particular feed for their particular user interface. In this case, the object model has properties that are read/write. For example, a user may wish to change the name of a feed from "New York Times" to "NYT". In this situation, the name property may be readable and writable.

Feed Synchronization Engine

In the illustrated and described embodiment, feed synchronization engine 108 (FIG. 1) is responsible for downloading RSS feeds from a source. A source can comprise any suitable source for a feed, such as a web site, a feed publishing site and the like. In at least one embodiment, any suitable valid URL or resource identifier can comprise the source of a feed. The synchronization engine receives feeds and processes the various feed formats, takes care of scheduling, handles content and enclosure downloads, as well as organizes archiving activities.

Figure 3:
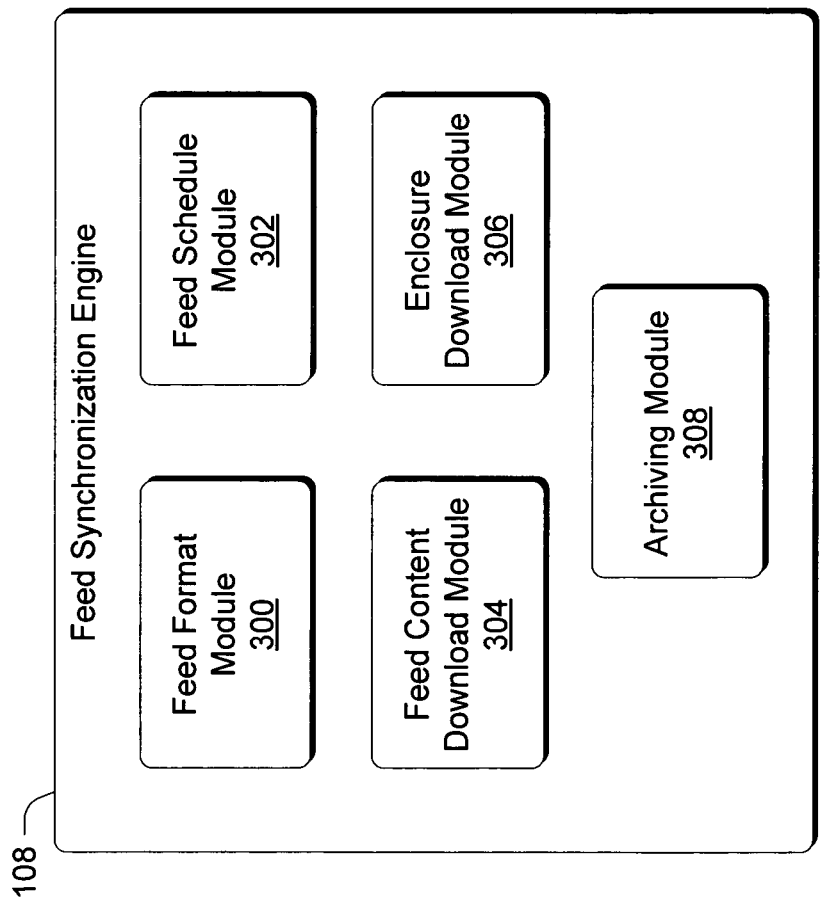
FIG. 3 is a block diagram that illustrates a feed synchronization engine in accordance with one embodiment.

FIG. 3 shows an exemplary feed synchronization engine 108 in a little more 19 detail in accordance with one embodiment. In this embodiment, synchronization engine includes a feed format module 300, a feed schedule module 302, a feed content download module 304, an enclosure download module 306 and an archiving module 308. It is to be appreciated and understood that these module are shown as logically separate modules for purposes of clearly describing their particular functionalities. The logically separate modules are not intended to limit the claimed subject matter to only the particular structures or architectures described herein.

Feed Format Module—300

In the illustrated and described embodiment, feeds are capable of being received in a number of different feed formats. By way of example and not limitation, these feed formats can include RSS 1.0, 1.1, 0.9×, 2.0, Atom 0.3, and so on. The synchronization engine, via the feed format module, receives these feeds in the various formats, parses the format and transforms the format into a normalized format referred to as the common format. The common format is essentially a superset of all supported formats. One of the benefits of using a common format is that applications that are format-aware now need to only be aware of one format—the common format. In addition, managing content that has been converted into the common format is much easier as the platform need only be concerned with one format, rather than several. Further, as additional syndication formats are developed in the future, the feed format module can be adapted to handle the format, while at the same time permit applications that are completely unaware of the new format to nonetheless leverage and use content that arrives at the platform via the new format.

With regard to the common format, consider the following. From a format standpoint, the common format is represented by an XML schema that is common between the different formats. In a different format, certain elements may have different names, different locations within the hierarchy of the XML format and the like. Accordingly, the common format is directed to presenting a common structure and syntax that is derived collectively from all of the different formats that are possible. Thus, in some instances, elements from one format may be mapped into elements of the common format.

Feed Schedule Module—302

Each feed can have its own schedule of when the synchronization engine 108 should check to ascertain whether there is new content available. Accordingly, the synchronization engine, through the feed schedule module 302, manages such schedules to respect a site's as well as a user's or a system's requirements and limitations.

As an example, consider the following. When a feed is first downloaded, an update schedule (i.e. a schedule of when the feed is updated) may be included in the feed's header. In this case, the feed schedule module 302 maintains the update schedule for this particular feed and checks for new content in accordance with the update schedule. If, however, no schedule information is included, then the feed schedule module can utilize a default schedule to check for new content. Any suitable default schedule can be used such as, for example, re-downloading the feed content every 24 hours. In at least some embodiments, the user may specify a different default work schedule.

In addition, in at least some embodiments, the feed schedule module can support what is referred to as a minimum schedule. The minimum schedule refers to a minimum update time that defines a period of time between updates. That is, the platform will not update a feed more often than what the minimum schedule defines. In at least some embodiments, the user can change the minimum time. In addition, the user can also initiate a manual refresh of any, or all feeds.

In addition to supporting default and minimum schedules, in at least some embodiments, the feed schedule module can support publisher-specified schedules. As the name implies, a publisher-specified schedule is a schedule that is specified by a particular publisher. For example, the publisher-specified schedule can typically specify how many minutes until the client should next update the feed. This can be specified using the RSS 0.9x/2.0 "ttl" element. The synchronization engine should not fetch a new copy of the feed until at least that number of minutes has passed. The publisher-specified schedule can also be specified at different levels of granularity such as hourly, daily, weekly, etc.

It should be noted that each copy of a feed document can have a different publisher-specified schedule. For example, during the day, the publisher may provide a schedule of 15 minutes, and then during the night, the publisher may provide a schedule of 1 hour. In this case, the synchronization engine updates its behavior every time the feed is downloaded.

In addition, in at least some embodiments, the synchronization engine, via the feed schedule module 302, supports the notion of skipping hours and/or days. Specifically, RSS 0.9 and 2.0 enable a server to block out certain days and hours during which the client should not conduct an update. In this case, the synchronization engine respects these settings, if provided by the server, and does not update the feed during those times.

In addition to the default, minimum and publisher-specified schedules, in at least some embodiments, the synchronization engine supports the notion of user-specified schedules and manual updates. More specifically, on a per-feed basis, the user can specify a schedule of their choice. From a platform perspective, the user-specified schedule can be as complex as specified by a server. In this instance, the platform, via the feed schedule module, maintains the most recent schedule extracted from the feed as well as the user schedule. In at least some embodiments, the user schedule always overrides the publisher's schedule. In addition, at any time, an application can initiate a forced update of all feeds or individual feeds.

With regard to bandwidth and server considerations, consider the following. In accordance with one embodiment, the synchronization engine can be designed in view of two related issues. First, the synchronization should be considerate of the user's bandwidth and CPU. Second, because of widespread use of the RSS platform, the synchronization engine should be considerate of its impact on servers. These two issues have an impact on both when and how feeds are downloaded.

From the perspective of when a feed is downloaded, synchronization engine can be designed with the following considerations in mind. In the absence of a schedule from the server, and any other instructions from the user, the synchronization engine should be very conservative in how often it updates. Hence, in at least some embodiments, the default schedule is set to 24 hours. Further, to protect the user's resources from being adversely impacted by an inefficient server, a minimum schedule can be enforced to keep the synchronization engine from updating too often, even if the server specifies otherwise. In addition, updates at login time (and at common intervals, e.g. each hour from the startup time) should be carefully managed. Feed updates should be delayed until a specified period of time after user login has completed, and should be staggered slightly to avoid large update hits each hour, on the hour. This can be balanced against a user's desire to have all of the updates happen at once. Further, when a server uses the skip hours or skip days feature described above, the client should not immediately fetch an update as soon as the moratorium period is over. Instead, the client should wait a random interval ranging up to 15 minutes before fetching the content.

To assist the synchronization engine in this regard, the feed schedule module 302 can maintain a state for each feed, such as fresh or stale. A "fresh" state means that, based on the publisher schedule, the feed is fresh. A "stale" state means that the publisher's schedule has indicated an update, but the synchronization engine has not yet completed the update. Clients with an interest in the freshest content can request an immediate update, and be notified when it is available. If this expectation is set, then the synchronization engine can implement arbitrary delays in updating the content, rather than rigorously following the schedule to the detriment of the user and the server.

With regard to how a feed is downloaded, consider the following. In one embodiment, the synchronization engine can use a task scheduler to launch a synchronization engine process at a pre-defined time. After the synchronization engine has completed, it updates a task schedule with the next time it should launch the synchronization engine again (i.e., NextSyncEngineLaunchTime).

When the synchronization engine launches, it queues up all "pending" feeds whose NextUpdateTime is less or equal to the currentTime and then processes them as follows. For each feed, the following properties are tracked: LastUpdateTime, NextUpdateTime, Interval (specified in minutes) and LastErrorInterval.

At the end of successfully synching a feed, the feed's LastUpdateTime is set to the current time and NextUpdateTime is set to LastUpdateTime plus an interval plus randomness (1/10th of the interval). Specifically:

```
LastUpdateTime = currentTime
NextUpdateTime = currentTime + Interval + Random(Interval * 0.1)
ErrorInterval = 0
```

Random(argument) is defined to be a positive value between 0 and its argument. For example Random(10) returns a float between 0 . . . 10.

If synching of a feed failed for one of the following reasons:

```
HTTP 4xx response code;
HTTP 5xx response code;
Winsock/network error; or
HTTP 200, but response body has a parsing error (not a recognized feed format)
``` then an exponential back off algorithm is applied as follows:

```
LastUpdateTime = <unchanged>
ErrorInterval = min( max(ErrorInterval * 2 , 1min), Interval)
NextUpdateTime = currentTime + ErrorInterval + Random(ErrorInterval * 0.1)
```

After synchronization of all "pending" feeds has completed, the synchronization engine determines if there are any feeds whose NextUpdateTime has passed (NextUpdateTime<=currentTime). If there are, then those "pending" feeds are queued and processed as if the synchronization engine just launched.

If there are no outstanding "pending" feeds, then the synchronization engine determines if there are any "soon-to-sync" feeds whose NextUpdateTime is within two minutes of the current time (currentTime+2 min>=NextUpdateTime). If there are any "soon-to-sync" feeds then the synchronization engine process continues to run, and it sets a timer to "wake up" at NextUpdateTime and process "pending" feeds.

If there are no "soon-to-sync" feeds then the NextSyncEngineLaunch is set to the NextUpdateTime of the feed with the soonest NextUpdateTime. Then the task scheduler is set to NextSyncEngineLaunchTime and the synchronization engine process ends.

In accordance with one embodiment, if there are several "pending" feeds in the queue, the synchronization engine can synchronize multiple feeds in parallel. However, the number of parallel synchronizations should be limited, as well as how many synchronizations are performed in a certain time period in order to not saturate network bandwidth and processor utilization. In accordance with one embodiment, feed synchronization shaping is provided via a token-bucket. Conceptually, the token bucket works as follows.

A token is added to the bucket every 1/r seconds;
The bucket can hold at most b tokens; if a token arrives when the bucket is full, it is discarded;
When a feed needs to be synchronized, a token is removed from the bucket and the feed is synchronized;
If no tokens are available, the feed stays in the queue and waits until a token becomes available.

This approach allows for bursts of feed synchronizations of up to b feeds. Over the long run, however, the synchronizations are limited to a constant rate r. In an implementation example, the synchronization engine uses the following values for b and r: b=4 and r=2.

Feed Content Download Module—304

In accordance with one embodiment, feed content download module 304 handles the process of downloading a feed and merging the new feed items with the existing feed data.

As an example of how one can implement a feed content download module, consider the following. At the appropriate time, the synchronization engine, via the feed content download module, connects to a server and downloads the appropriate content.

In accordance with one embodiment, the platform is configured to support different protocols for downloading content. For example, the synchronization engine can support downloading the feed document over HTTP. In addition, the synchronization engine can support encrypted HTTP URLs (e.g., SSL, https and the like). Likewise, the synchronization engine can also support compression using the HTTP gzip support, as well as support feed downloads from Universal Naming Convention (UNC) shares.

In addition, the synchronization engine via the feed content download module can support various types of authentication. For example, the synchronization engine can store a username/password for each feed, and can use this username/password for HTTP Basic authentication to retrieve the feed document.

With regard to updating a feed, consider the following. To determine if a feed has new content, the synchronization engine keeps the following pieces of information, for each feed:

The last time the feed was updated as reported by the Last-modified header on the HTTP response;
The value of the Etag header in the last HTTP response; and
The most recent pubDate value for the feed (i.e. the feed-level publication date and time).

If the site supports Etag or Last-modified, then the synchronization engine can use these to check if there is new content. The site can respond with an HTTP response code 304 to indicate that there is no new content. Otherwise, the content is downloaded. For example, if the site supports RFC 3229-for-feeds, the site can return only the new content, based on the Etag passed by the client. Either way, the client then merges the new content with the stored content.

As a more detailed description of how feed content can be downloaded in but one implementation example, consider the following. To determine if a particular site has changed, the synchronization engine will submit a request with:

The If-None-Match header, if the client has a saved Etag;
The header A-IM with the values: feed, gzip (used for RFC 3229-for-feeds);
The If-Modified-Since header, if the client has a saved Last-modified value.

If the server responds with an HTTP Response code 304, then the content has not changed and the process may end here. If the server responds with content (i.e. HTTP codes 200 or 206), then the downloaded content is merged with the local content (note: code 206 means that the server supports RFC3229-for-feeds, and the content downloaded is only the new content).

If there is content available and if the synchronization engine has a pubDate stored, and the downloaded feed document contains a channel-level pubDate element, the two dates are compared. If the local pubDate is the same as the downloaded pubDate, then the content has not been updated. The downloaded feed document can then be discarded.

If the synchronization engine processes each item one at a time, each item's pubDate is compared against the pubDate that the synchronization engine has stored (if any) and older items are discarded. Each item is then compared against the items in the store. The comparison should use the guid element, if present, or the link element, if guid is not present. If a match is found, then the content of the new item replaces that of the old item (if both have a pubDate, then it is used to determine which is newer, otherwise, the most recently downloaded is new). If no match is found, then the new item is pre-pended to the stored feed content (maintaining a "most recent at the top" semantic). If any item is added or updated in the local feed, the feed is considered updated, and clients of the RSS platform are notified.

For error cases, consider the following. If the server responds with a code 500 or most 400 errors, the synchronization schedule is reset and the server tries again later. The HTTP error 410, however, should be treated as an indication to reset the update schedule to "no more updates."

HTTP-level redirects should be followed, but no changes should be made to the client configuration (there are several pathological scenarios where redirects are given accidentally).

If the server responds with an XML redirect, then the feed should be redirected, and the stored URL to the feed should be automatically updated. This is the only case where the client updates the feed URL automatically.

With regard to downloading the feed, the download should not interrupt ordinary usage of the machine (e.g., bandwidth or CPU) when the user is engaged in other tasks. In addition, the user should be able to get the content as fast as possible when in an interactive application that relies on the content.

Enclosure Download Module—306

In accordance with one embodiment, enclosure download module 306 is responsible for downloading enclosure files for a feed and applying the appropriate security zone. At the time of downloading the feed content, the enclosures are downloaded as well.

Downloading enclosures can be handled in a couple of different ways. First, a basic enclosure is considered to be an RSS 2.0-style enclosure. For basic enclosures, the synchronization engine, via the enclosure download module 306, will automatically parse the downloaded feeds for enclosure links. The synchronization engine is configured to support multiple basic enclosures. Using the enclosure link, the enclosure download module can then download the enclosure. In at least some embodiments, for any new feed, the default action is not to download basic enclosures. Using the API which exposes the above-described object model, client can do such things as change the behavior on a per-feed basis to, for example, always download enclosures or force the download of a specific enclosure of a specific item in a specific feed.

Enhanced enclosure handling can be provided through the use of the common format described above. Specifically, in at least one embodiment, the common format defines additional functionality for enclosures. Specifically, the common format enables multiple representations of a particular piece of content. This includes, for example, including standard definitions of preview content and default content, as well as the ability to indicate whether an enclosure should be downloaded or streamed. In addition, the common format permits arbitrary metadata on an enclosure, and on representations of the content. For any new feed, the default action is to download the "preview" version of any enclosure, subject to a default size limit of, for example, 10 k per item.

Using the API, clients can do such things as change the behavior on the per-feed basis. For example, the behavior can be changed to always download the "default" version of the items in a feed or to always download any specific version that has a metadata element of a particular value. This can be done, for example, with a client callback which provides the "download this?" logic for each enclosure. In addition, using the API, clients can force immediate download of any specific representation of any specific enclosure of any specific item (or all items) in a specific feed.

With regard to providing security in the enclosure download process, consider the following.

In accordance with one embodiment, downloaded enclosures use the Windows XP SP2 Attachment Execution Service (SP2 AES) functionality. This functionality can provide file-type and zone based security. For example, provided with a file name and zone information (i.e. where an enclosure came from), AES can indicate whether to block, allow or prompt.

With regard to zone persistence, when saving a file, AES can persist the zone information so that, when it is subsequently opened, the user can be prompted.

The table just below describes AES risk-level/zone to action mapping:

| Risk Levels | Restricted | Internet | Intranet | Local | Trusted |
|---|---|---|---|---|---|
| Dangerous, e.g. EXE | Block | Prompt | Allow | Allow | Allow |
| Moderate/Unknown, e.g. DOC or FOO | Prompt | Prompt | Allow | Allow | Allow |
| Low, e.g. TXT or JPG | Allow | Allow | Allow | Allow | Allow |

In the illustrated and described embodiment, the synchronization engine will call a method, for example ::CheckPolicy, for each enclosure that it downloads. Based on the response, the synchronization engine can do one of the following:

Block: Don't save (mark it as failed in the feed file);
Allow: Save the enclosure
Prompt: Save, but persist, zone information. This means that if the user double-clicks on the file, they'll get a "Run/Don't Run" prompt.

In accordance with one embodiment, the synchronization engine will first save an enclosure to disk and will not download the enclosure in memory. Saving to disk triggers filter-based antivirus applications and gives these applications an opportunity to quarantine the enclosure if they choose.

Archiving Module—308

In accordance with one embodiment, archiving module 308 is responsible for dealing with old feed data. By default, a feed will hold a maximum of 200 items. When a feed exceeds the specified maximum, the older feed items are deleted by the archiving module. The associated enclosures are not, however, deleted.

Feed Store

Figure 4:
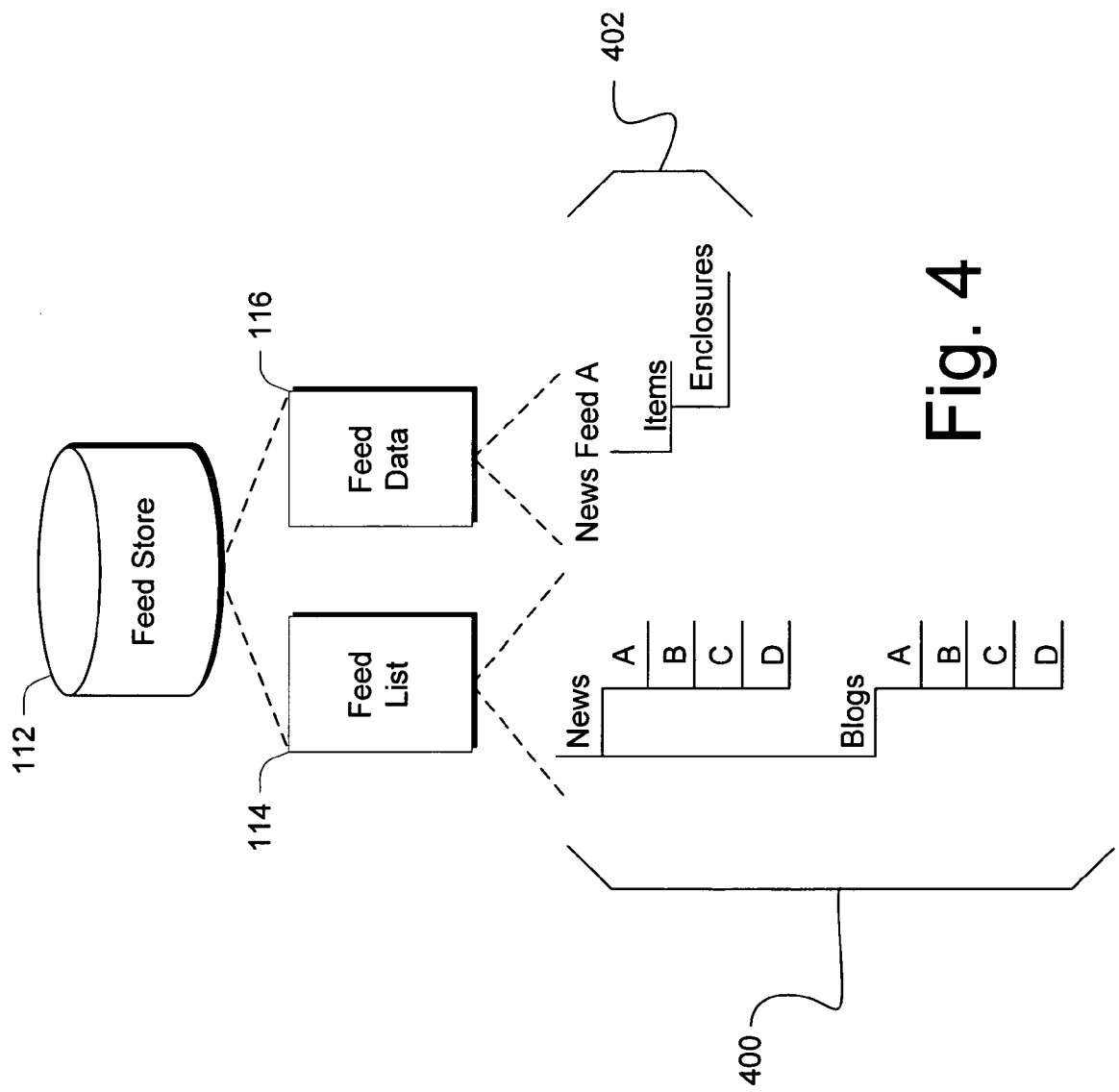
FIG. 4 illustrates an exemplary feed store in accordance with one embodiment.

In accordance with one embodiment, feed store 112 (FIG. 1) holds two types of information—a feed list 114 and feed data 116. As an example, consider FIG. 4. There, feed list 114 is embodied as a hierarchical tree structure 400 of the list of feeds. The feed data 116 comprises the data associated with a particular feed. In this example, the feed data 116 is arranged on a per-feed basis to include a collection 402 of items and enclosures.

There are many different ways that one might implement a feed store. In this particular embodiment, the feed store comprises part of the file system. One reason for this pertains to simplicity. That is, in this embodiment, the feed list is represented simply as a regular directory under which there can be sub-directories and files. The hierarchy is reflected as a normal file system hierarchy. Thus, each folder such as "News" and "Blogs" is essentially a regular directory in the file system with subdirectories and files.

In this particular example, there is a special file type that represents a feed subscription. By way of example only, consider that this type of file has the following format: "xyz.stg". The .stg file stores all of the data for a feed. Thus, you have a feed list, such as the list embodied in tree structure 400, and inside each feed (or file) is the feed data.

In the illustrated and described embodiment, the .stg files are implemented using structured storage technology. Structure storage techniques are known and will be appreciated by the skilled artisan. As brief background, however, consider the following.

Structured storage provides file and data persistence in COM by handling a single file as a structured collection of objects known as storages and streams. The purpose of structured storage is to reduce the performance penalties and overhead associated with storing separate object parts in different files. Structured 11 storage provides a solution by defining how to handle a single file entity as a structured collection of two types of objects—storages and streams—through a standard implementation called compound files. This enables the user to interact with, and manage, a compound file as if it were a single file rather than a nested hierarchy of separate objects. The storage objects and stream objects function as a file system within a file, as will be appreciated by the skilled artisan. Structured storage solves performance problems by eliminating the need to totally rewrite a file to storage whenever a new object is added to a compound file, or an existing object increases in size. The new data is written to the next available location in permanent storage, and the storage object updates the table of pointers it maintains to track the locations of its storage objects and stream objects.

Thus, in the illustrated and described embodiment, the .stg files are implemented using structured storage techniques and an API on top of the feed store allows access to the different streams and storages. In this particular example, each RSS item is written into one stream. Additionally, a header stream contains information associated with a particular feed such as the title, subscription, feed URL and the like. Further, another stream stores index-type metadata that allows quick and efficient access to contents in the file for purposes that include quickly marking something as read/unread, deleting an item and the like.

File System—Enclosures

In the illustrated and described embodiment, enclosures are not stored in structured storage or as part of the feed data, as indicated in FIG. 1. Rather, enclosures are recognized as being items, such as a picture or pictures, that other applications and the user may want to access and manipulate.

Thus, in the illustrated and described embodiment, enclosures are written into a user's particular profile. A link, however, is maintained between the enclosure and the associated feed item.

Figure 5:
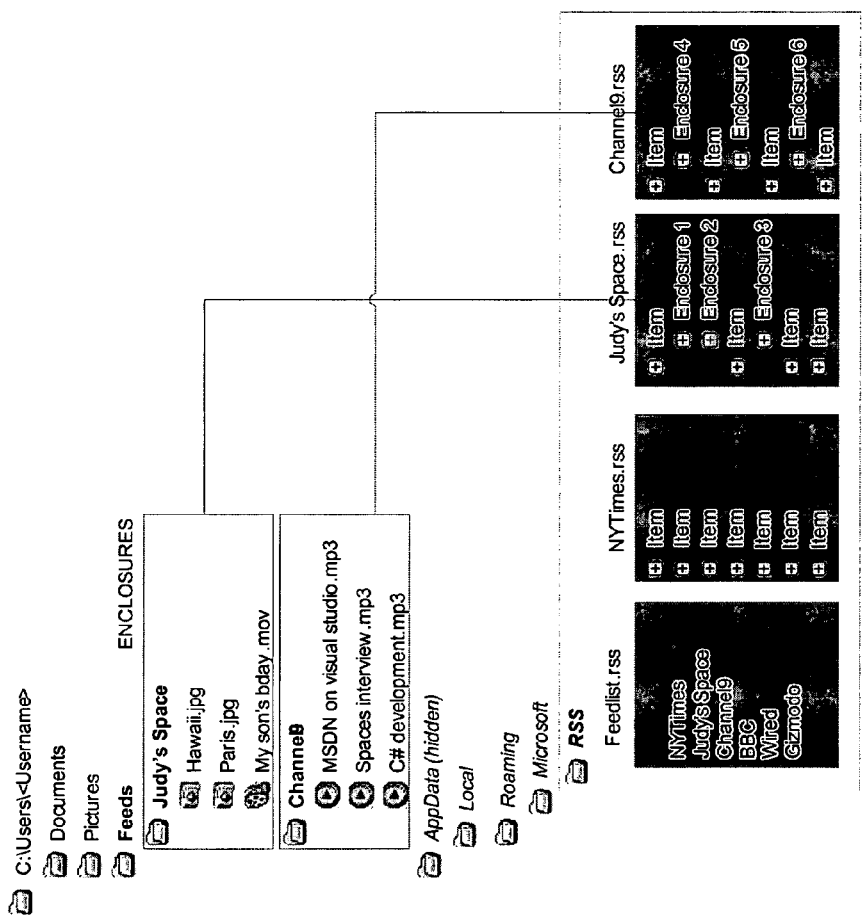
FIG. 5 illustrates an exemplary user's profile in accordance with one embodiment.

As an example, consider FIG. 5. Once a user starts subscribing to a feed, the feed content is stored locally under the user's profile, either in Application Data or in a Knownfolder "feeds".

The feedlist and feeds are stored in Application Data to better be able to control the format of the feedlist and the feeds. APIs are exposed (as will be described below) such that applications can access and manage the feeds.

The feedlist is the set of feeds that the user is subscribed to. In this example, the file that comprises the Feedlist is located at:

C:\Users\<Username>\AppData\Roaming\Microsoft\RSS\

The file contains the feed's properties, as well as items and enclosure properties (a URL to the file that is associated to the item). For example, the file for feed "NYT" is located at:

C:\Users\<Username>\AppData\Roaming\Microsoft\RSS\NYT.stg

In this example, the enclosures are grouped by feed and stored in the Knownfolder "feeds". This enables the user and other applications to easily access and use downloaded files.

For example, a user subscribes to the NPR feed and wants to make sure that their media player application can automatically add those files. Making this a Knownfolder enables the user to browse to it from the media player and set it as a monitored folder. Enclosures have the appropriate metadata of the feed and post such that applications can access the associated post and feed. Enclosures are located as follows:

C:\Users\<Username>\Feeds\<Feedname>\

Each enclosure that is written to the user's hard disk will have a secondary stream (e.g., a NTFS stream) which contains metadata about this enclosure. The metadata can include by way of example and not limitation, the feed that enclosure is from, author, link to feed item, description, title, publish date, and download date as well as other meta data as appropriate.

Publishing Engine/Post Queue

Many times when one writes a regular blog post, essentially what is being written is an RSS item. This RSS item is typically sent to some type of server, and this server maintains account information, the location of the blog, and the like. In this context, publishing engine 110 (FIG. 1) is configured to enable an application to make a posting or publish content, while at the same time abstract from the application the communication protocol that is utilized to communicate with the server. Hence, the application need only provide the data or content that is to be posted, and the publishing engine will handle the remaining task of formatting and communicating the content to the appropriate server.

As there can be several different protocols that are used, abstracting the protocols away from the applications provides a great deal of flexibility insofar as enabling many different types of applications to leverage the publishing functionality. In the illustrated and described embodiment, the publishing engine's functionality is implemented as an API that allows an application to post a blog without having to be knowledgable of the protocol used to communicate with the server.

Hence, in this example, the API has a method to create a new post which, when called, creates an RSSItem object. This RSSItem object has a post method which, when called, stores the content—in this case a blog—in a temporary store, i.e. post queue 122 (FIG. 1). The content is stored in a temporary store because the user may not be on line at the time the blog is created. Then, when the user makes an on line connection, publishing engine 110 makes a connection to the appropriate server and uses the server-appropriate protocol to upload the blog to the server.

Implementation Example

In the description that follows, an exemplary set of APIs is described to provide but one example of how one might implement and structure APIs to implement the above-described functionality. It is to be appreciated and understood that other APIs can be utilized without departing from the spirit and scope of the claimed subject matter. The described APIs are typically embodied as computer-readable instructions and data that reside on some type of computer-readable medium.

The APIs that are described below can be used to manipulate the set of 11 feeds that a user is subscribed to (System Feed List) and the properties on the feeds. In addition, feed data APIs (i.e., item and enclosures) provide access to feeds that are stored in the feed store, as well as ad-hoc download of feeds. Using the Feed APIs, applications such as web browsers, media players, digital image library applications and the like can then expose the feed data within their experience.

In the example about to be described, the APIs are implemented as COM dual interfaces which also makes the APIs useable from scripting languages, managed code as well as native Win32 (C++) code.

Figure 6:
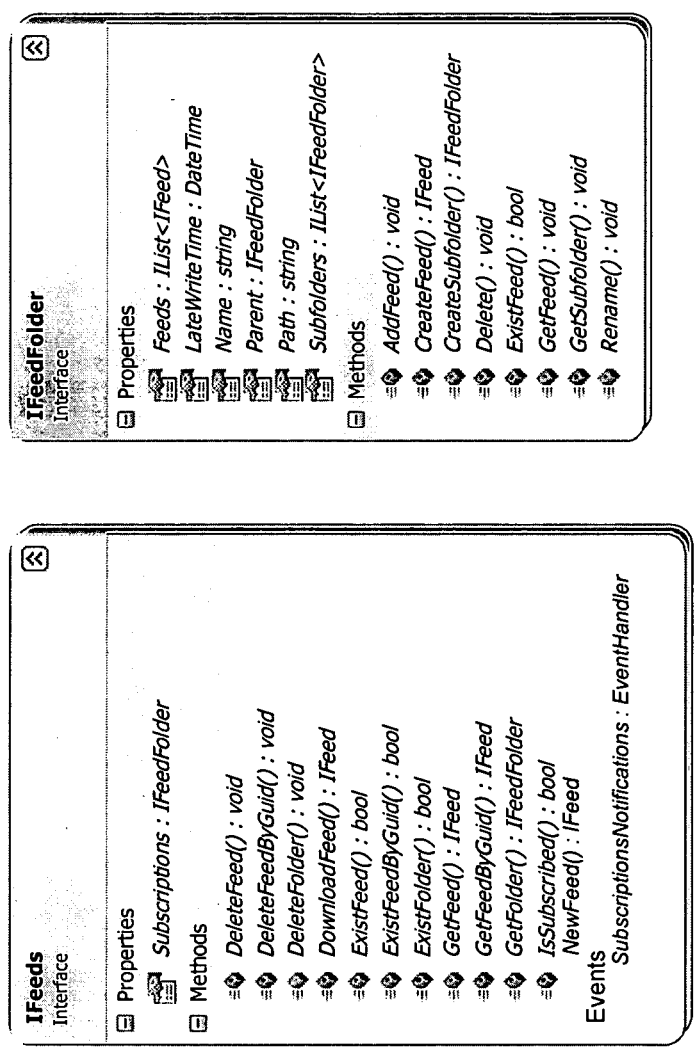
FIG. 6 illustrates exemplary objects in accordance with one embodiment.

FIG. 6 illustrates a top level object or interface IFeeds and an IFeedFolder object or interface together with their associated properties, methods and events in accordance with one embodiment.

In this example, IFeeds has one property—subscriptions which is an IFeedFolder. This is a root folder for all subscriptions. There are a number of methods on the root object such as DeleteFeed( ), DeleteFeedByGuid( ), DeleteFolder( ) and the like.

Of interest in this example is the GetFeedByGuid( ) method. This method can be called by applications to access a particular feed by, for example, the feed's GUID. Thus, the application need not be knowledgeable of the hierarchical ordering of the feeds. Rather, the feed's GUID can be used by the application to enable the platform to fetch the feed.

In addition, the ExistFeed( ) method checks for the existence of a feed by name, and the ExistFeedByGuid( ) check for a feed's existence by GUID. The GetFeed( ) method gets a feed by name or by GUID. The IsSubscribed( ) method enables an application or caller to ascertain whether a particular feed has been subscribed to.

In addition, the IFeeds object also has a SubscriptionsNotifications event which allows for registration for notifications for changes on the system feed list.

As noted above, Subscriptions are of the type IFeedFolder. The IFeedFolder object or interface essentially provides a directory and has similar kinds of properties such as the Name, Parent, Path and the like. In addition, the IFeedFolder object has a Feeds property of the type IFeed and a Subfolders property of the type IFeedFolder. The Subfolders property pertains to a collection of the folders underneath the instant folder (e.g., this is where the hierarchical structure derives) and Feeds property pertains to the actual feeds in a particular folder. In addition, the IFeedFolder has a LastWriteTime property which indicates the last time that anything was written to inside the folder. This property is useful for applications that may not have been running for a while, but yet need to look at the feed platform and ascertain its state so that it can synchronize if necessary.

There are a number of methods on the IFeedFolder, at some of which pertain to creating a feed (which creates a feed that the system does not have and adds it to a particular folder), creating a subfolder, deleting a folder or subfolder and the like.

Figure 7:
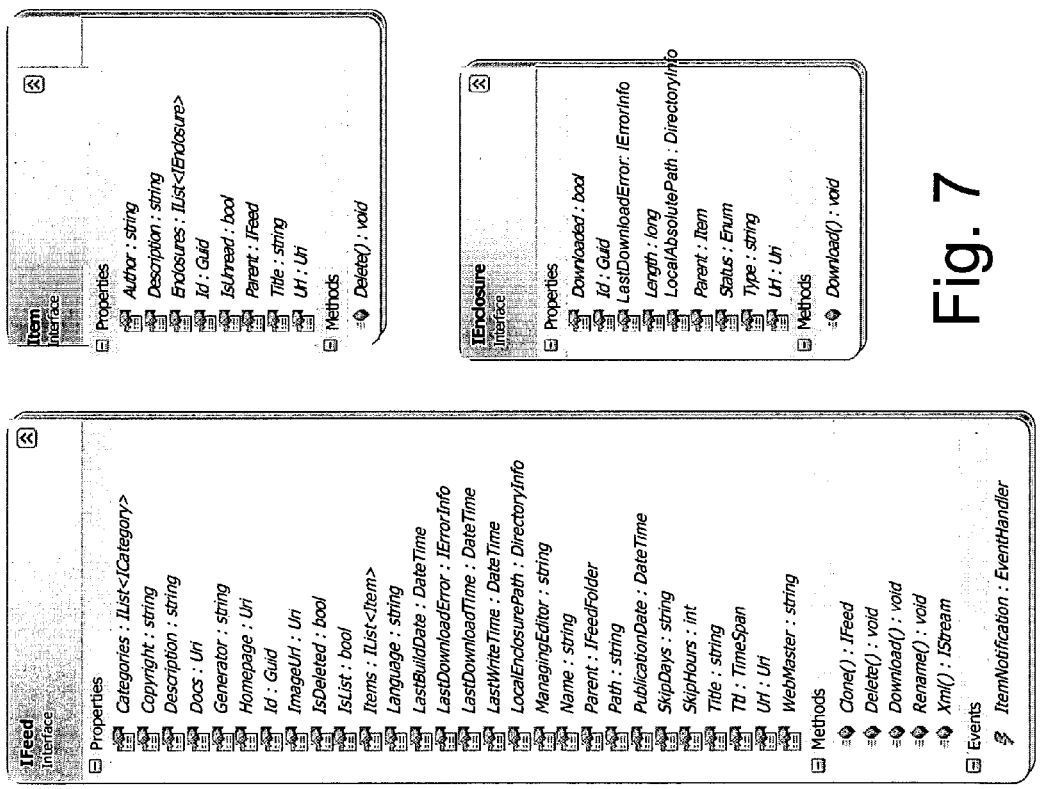
FIG. 7 illustrates exemplary objects in accordance with one embodiment.

FIG. 7 illustrates additional objects and their associated methods in accordance with one embodiment. Specifically illustrated are the IFeed, Item and IEnclosure objects.

Starting first with the IFeed object, consider the following. Many of the properties associated with this object come from the RSS feed itself, e.g, Title, Url, Webmaster, SkipHours, SkipDays, ManagingEditor, Homepage, ImageURL and the like, as will be appreciated by the skilled artisan. In addition, there is another set of properties of interest, i.e. the Items property which is a collection that has all of the items that are part of a feed and the LocalEnclosurePath property which provides the actual directory to which all of the enclosures are written. Thus, for an application, the latter property makes it very easy for an application to access the enclosures.

In addition, this object supports a small set of methods such as Delete( ) and Download( ) which are used to manage particular feeds. Further, this object supports a method XML( ), which returns a feed's XML in the common format. The XML data can be used for such things as creating a newpaper view of a feed. Clone( ) returns a copy of the feed that is not subscribed to.

Moving to the Item object, this object has a set of properties that represent regular RSS elements, e.g. Description, Url, Title, Author and the like. In addition, there is a Parent property that points back to the associated actual feed, and an Id property so that an application can manipulate the Id versus having to iterate over all items. In addition, there is an Enclosures property which is the collection of the item's enclosures of the type IEnclosure. Further, an IsRead property enables an application to indicate whether a particular item has been read.

Moving to the Enclosure object, consider the following. This object has properties that include a Type property (e.g. mp3) and Length property that describes the length of a particular enclosure. There is also the LocalAbsolutePath to a particular enclosure. The Download( ) method allows individual enclosures to be downloaded and used by applications.

CONCLUSION

The web content syndication platform described above can be utilized to manage, organize and make available for consumption content that is acquired from the Internet. The platform can acquire and organize web content, and make such content available for consumption by many different types of applications. These applications may or may not necessarily understand the particular syndication format. An application program interface (API) exposes an object model which allows applications and users to easily accomplish many different tasks such as creating, reading, updating, deleting feeds and the like. In addition, the platform can abstract away a particular feed format to provide a common format which promotes the useability of feed data that comes into the platform. Further, the platform processes and manages enclosures that might be received via a web feed in a manner that can make the enclosures available for consumption to both syndication-aware applications and applications that are not syndication-aware.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:
1. A system comprising:
one or more computing devices having one or more processors;
one or more computer-readable media associated with one or more computing devices;
computer-readable instructions on the one or more computer-readable media which, when executed by a client device of the one or more computing devices, implement:
an RSS (really simple syndication) platform, included in the client device, that is configured to receive and process RSS data in multiple RSS file formats and convert the RSS data into a common format that is usable by different types of applications and which is represented by an extensible markup language (XML) schema that includes common structure and syntax derived collectively from different formats associated with the different types of applications, the RSS platform being configured to:
accept multiple feeds of RSS data;
automatically parse an accepted feed for enclosure links;
download an enclosure file associated with an enclosure link; and
delete a feed item when a number of feed items exceeds a user-specified or default value; and
code means configured to enable the different types of applications to access the RSS data that has been received, processed, and converted by the RSS platform, the code means being configured to expose an object model to represent feed subscriptions in a hierarchy and enable one or more applications that are not subscribed to the feed and do not understand XML that describes the RSS data to access associated RSS data that is received and processed by the RSS plat- form through the object model, the RSS platform being separate from the one or more applications on the client device.

2. The system of claim 1, wherein the RSS platform is configured to receive and process RSS data in multiple different formats, and wherein the RSS platform is configured to convert the multiple different formats into a common format.

3. The system of claim 1, wherein said different types of applications include applications other than RSS readers.

4. The system of claim 1, wherein said different types of applications include applications that do not understand formats in which the RSS data is received by the platform.

5. The system of claim 1, wherein said different types of applications include applications that do not understand formats in which the RSS data is received by the platform, and wherein the different types of applications comprise one or more of a web browser application, email application or a media player application.

6. The system of claim 1, wherein the different types of applications comprise one or more of a web browser application, email application or a media player application.

7. A system comprising:
one or more computing devices having a processor;
one or more computer-readable media associated with the one or more computing devices;
a set of application program interfaces (APIs) embodied on the computer-readable media, the set of APIs comprising one or more methods that enable at least one application to access RSS (really simple syndication) data that has been processed and converted into a common format by a client device of the one or more computing devices to parse extensible markup language (XML) used to describe the RSS data and stored in a feed store, the one or more methods enabling accessed RSS data to be automatically parsed for enclosure links and an enclosure file associated with an enclosure link to be downloaded, the one or more methods enabling a feed item to be deleted when a number of feed items exceeds a user-specified or default value, the common format being represented by an XML schema that includes common structure and syntax derived collectively from different formats associated with the different types of applications, the feed store comprising at least one feed list and feed data, the at least one feed list being embodied as a hierarchical structure that describes a list of feeds in accordance with an object model that enables access to the list of feeds through representations in the hierarchical structure, the feed data comprising data associated with particular feeds, at least some feed data including at least collections of items and enclosures, said at least one application being separate from the set of APIs on the client device and not understanding an RSS format in which the RSS data was originally embodied and the XML used to describe the RSS data.

8. The system of claim 7, wherein said one or more methods comprise a method that provides access to a data store in which one or more enclosures are stored, and a method that can be used to discover a relationship between an enclosure and its associated feed item.

9. The system of claim 7, wherein said one or more methods comprise methods that provide access for multiple different types of applications.

10. The system of claim 7, wherein said one or more methods comprise methods that provide access for multiple different types of applications, and wherein at least one of said multiple different types of applications understands an RSS format in which the RSS data was originally embodied.

11. The system of claim 7, wherein said one or more methods comprise methods that provide access for multiple different types of applications, and wherein at least one of said multiple different types of applications understands an RSS format in which the RSS data was originally embodied and comprises an RSS reader.

12. The system of claim 7, wherein said one or more methods comprise methods that provide access for multiple different types of applications, and wherein at least one of said multiple different types of applications understands an RSS format in which the RSS data was originally embodied and comprises a web browser application.

13. The system of claim 7, wherein said one or more methods comprise a method that enables an application to access data associated with a web feed to which said application is not subscribed.

14. The system of claim 7, wherein said one or more methods comprise methods that model feed subscriptions as a hierarchy of folders.

15. The system of claim 7, wherein said at least one application comprises an email application.

16. The system of claim 7, wherein said at least one application comprises a web browser application.

17. The system of claim 7, wherein said at least one application comprises a media player application.

18. A system comprising:
one or more computing devices having one or more processors;
one or more computer-readable storage media;
computer-readable instructions on the one or more computer-readable storage media which, when executed via the one or more computing devices, implement:
an RSS (really simple syndication) platform that is configured to receive and process RSS data in one or more formats,
wherein the RSS platform comprises an object model in which feed subscriptions are modeled as a hierarchy of folders, subfolders, feeds, items, and enclosures,
wherein the object model is configured to provide access to a shared list of feed subscriptions,
wherein the object model comprises a method to allow a feed to be downloaded without subscribing to the feed,
wherein the RSS platform comprises a feed synchronization engine comprising:
a feed format module configured to receive feeds in various formats and transform the feeds into a common format,
a feed schedule module configured to manage one or more schedules that indicate when the synchronization engine should check to ascertain whether there is new content available for a feed, wherein the one or more schedules comprise at least one of an update schedule included in a feed header, a default schedule, a minimum schedule, a publisher-specified schedule, or a user-specified schedule,
a feed content download module configured to download feeds and merge new feed items with existing feed data,
an enclosure download module configured to automatically parse a downloaded feed for enclosure links and download an enclosure file associated with an enclosure link, and an archiving module configured to delete a feed item when a number of feed items exceeds a user-specified or default value; and wherein the RSS platform is configured to enable different types of applications that are separate from the RSS platform to access RSS data that has been received and processed by the RSS platform, and wherein the RSS platform is configured to enable one or more applications that are not subscribed to a feed to access associated RSS data that is received and processed by the RSS platform without having to understand a syndication format used to express the RSS data.

19. A system comprising:

a client computing device having a processor;

one or more computer-readable media associated with the client computing device;

computer-readable instructions on the one or more computer-readable media which, when executed by the client computing device, implement:

an API (application program interface) configured to:
enable different types of applications to access RSS data that has been received, processed, and converted into a common format by a RSS (really simple syndication) platform that is on the client computing device and separate from one or more applications on the client computing device, the common format being represented by an extensible markup language (XML) schema that includes common structure and syntax derived collectively from different formats associated with the different types of applications;

expose an object model provided by the RSS platform to represent RSS data for feed subscriptions in a hierarchy configured to enable access to the feed subscriptions;

enable accessed RSS data to be automatically parsed for enclosure links and an enclosure file associated with an enclosure link to be downloaded;

enable a feed item to be deleted when a number of feed items exceeds a user-specified or default value; and enable the one or more applications that are not subscribed to a feed and do not understand XML that describes the RSS data to access from multiple sources associated RSS data that is received, processed, and converted by the RSS platform, the RSS data comprising: at least one item having content and a link to a source of the content; and at least one enclosure having a file and a link to a source of the file.

20. The system of claim 19, wherein said different types of applications include applications that do not understand formats in which the RSS data is received by the platform.

21. The system of claim 19, wherein the API exposes the object model represents the feed subscriptions as a hierarchy of folders, and wherein the object model provides access to a shared list of feed subscriptions.

22. A computing device comprising:

a processor;

computer-readable instructions stored on the computing device that, responsive to execution by the processor, cause the computing device to implement:

an RSS (really simple syndication) platform, included in the computing device, that is configured to receive and process RSS data in multiple RSS file formats and convert the RSS data into a common format that is usable by different types of applications and which is represented by an extensible markup language (XML) schema that includes common structure and syntax derived collectively from different formats associated with the different types of applications, the RSS platform being configured to:

accept multiple feeds of RSS data;

represent feed subscriptions for the RSS data in a hierarchy configured to enable access to the feed subscriptions in accordance with an object model;

automatically parse an accepted feed for enclosure links;

download an enclosure file associated with an enclosure link; and delete a feed item when a number of feed items exceeds a user-specified or default value; and one or more interfaces configured to enable the different types of applications to access the RSS data that has been received, processed, and converted by the RSS platform, the one or more interfaces being configured to enable one or more applications that are not subscribed to the feed and do not understand XML that describes the RSS data to access associated RSS data that is received and processed by the RSS platform, the RSS platform being separate from the one or more applications on the computing device.

* * * * *